US009473464B2

(12) United States Patent
Downey et al.

(10) Patent No.: US 9,473,464 B2
(45) Date of Patent: Oct. 18, 2016

(54) KEY MANAGEMENT FOR MIXED ENCRYPTED-UNENCRYPTED CONTENT

(71) Applicant: Verizon Patent and Licensing Inc., Arlington, VA (US)

(72) Inventors: William S. Downey, Franklin, MA (US); Rory W. Britt, Warren, NJ (US); Stephanie A. Fastert, Chelmsford, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 140 days.

(21) Appl. No.: 14/491,506

(22) Filed: Sep. 19, 2014

(65) Prior Publication Data

US 2016/0087944 A1    Mar. 24, 2016

(51) Int. Cl.
*H04L 29/06* (2006.01)
*G06F 21/10* (2013.01)

(52) U.S. Cl.
CPC .......... *H04L 63/0428* (2013.01); *G06F 21/10* (2013.01); *H04L 63/061* (2013.01)

(58) Field of Classification Search
None
See application file for complete search history.

(56) References Cited

U.S. PATENT DOCUMENTS

| | | | | |
|---|---|---|---|---|
| 7,681,243 B2* | 3/2010 | Kim | ....................... | G06Q 30/02 713/168 |
| 7,912,217 B2* | 3/2011 | Baugher | .............. | H04N 7/1675 380/200 |
| 8,438,646 B2* | 5/2013 | Sidi | ...................... | H04N 5/4401 705/57 |
| 8,671,000 B2* | 3/2014 | Aaltonen | ............... | G06Q 30/02 705/35 |
| 2002/0026636 A1* | 2/2002 | LeComte | ............ | H04N 5/4401 725/31 |
| 2005/0033700 A1* | 2/2005 | Vogler | ................... | G06Q 30/02 705/57 |
| 2006/0039565 A1* | 2/2006 | Kim | ....................... | H04N 5/913 380/277 |
| 2007/0266399 A1* | 11/2007 | Sidi | ...................... | H04N 5/4401 725/42 |
| 2008/0089516 A1* | 4/2008 | Cocchi | ................... | H04N 5/913 380/200 |
| 2010/0228630 A1* | 9/2010 | Mikkelsen | ............. | G06Q 30/02 705/14.66 |
| 2013/0125223 A1* | 5/2013 | Sorotokin | ............. | H04L 9/3213 726/6 |

OTHER PUBLICATIONS

Wikipedia, "Conditional Access," http://en.wikipedia.org/wiki/Conditional_access, Jul. 9, 2014, 6 pages.

* cited by examiner

*Primary Examiner* — Michael R Vaughan

(57) ABSTRACT

Based on a request for media content from a media client, a device identifies one or more: segments of encrypted media content; encryption keys for decrypting the segments of encrypted media content; and segments of unencrypted media content. The device determines an order for sending the one or more segments of encrypted and unencrypted media content. The device sends, to the media client, a segment of encrypted media content, according to the order for sending, along with an encryption key for decrypting the segment of encrypted media content being sent. The device sends, to the media client, a segment of unencrypted media content, according to the order for sending, along with a subsequent encryption key for decrypting a subsequent segment of encrypted media content to be sent after the segment of unencrypted content. The subsequent encryption key permits the media client to decrypt the subsequent segment of encrypted media content.

20 Claims, 10 Drawing Sheets

KEY MANAGEMENT FOR MIXED ENCRYPTED-UNENCRYPTED CONTENT

BACKGROUND

A user of a media client may direct the media client to play media content that includes encrypted and/or unencrypted segments of media content. The media client may decrypt an encrypted segment using a decryption key.

DETAILED DESCRIPTION OF PREFERRED EMBODIMENTS

The following detailed description of example implementations refers to the accompanying drawings. The same reference numbers in different drawings may identify the same or similar elements.

A user of a media client may direct the media client to play media content that includes unencrypted segments of media content (e.g., advertisements, interactive content, etc.) interspersed between encrypted segments of media content (e.g., segments of music, a film, a television show, or the like). To decrypt an encrypted segment, the media client may first acquire an encryption key associated with the encrypted segment. The acquisition of the encryption key may introduce a delay which interferes with the media client's ability to smoothly transition to the encrypted segment from an unencrypted segment, which may not require an encryption key. By receiving the encryption key with the unencrypted segment, in advance of receiving the encrypted segment, the media client may avoid the delay of acquiring the encryption key and transition smoothly from the unencrypted segment to the encrypted segment.

Implementations described herein may be particularly beneficial for dynamically inserting unencrypted advertisements between segments of encrypted audio/video content when operating within a conditional access system ("CAS"), where an encrypted segment may be decrypted with a secret key (e.g., a control word) extracted from an encrypted entitlement control message ("ECM") (e.g., by passing the ECM through a conditional access module ("CAM")). By receiving the ECM with unencrypted advertisements, the media client may extract and store the secret key in advance of receiving subsequent encrypted segments, thus preventing delayed playback and/or scrambled audio/video which may otherwise result from later acquisition of the ECM.

Figure 1:
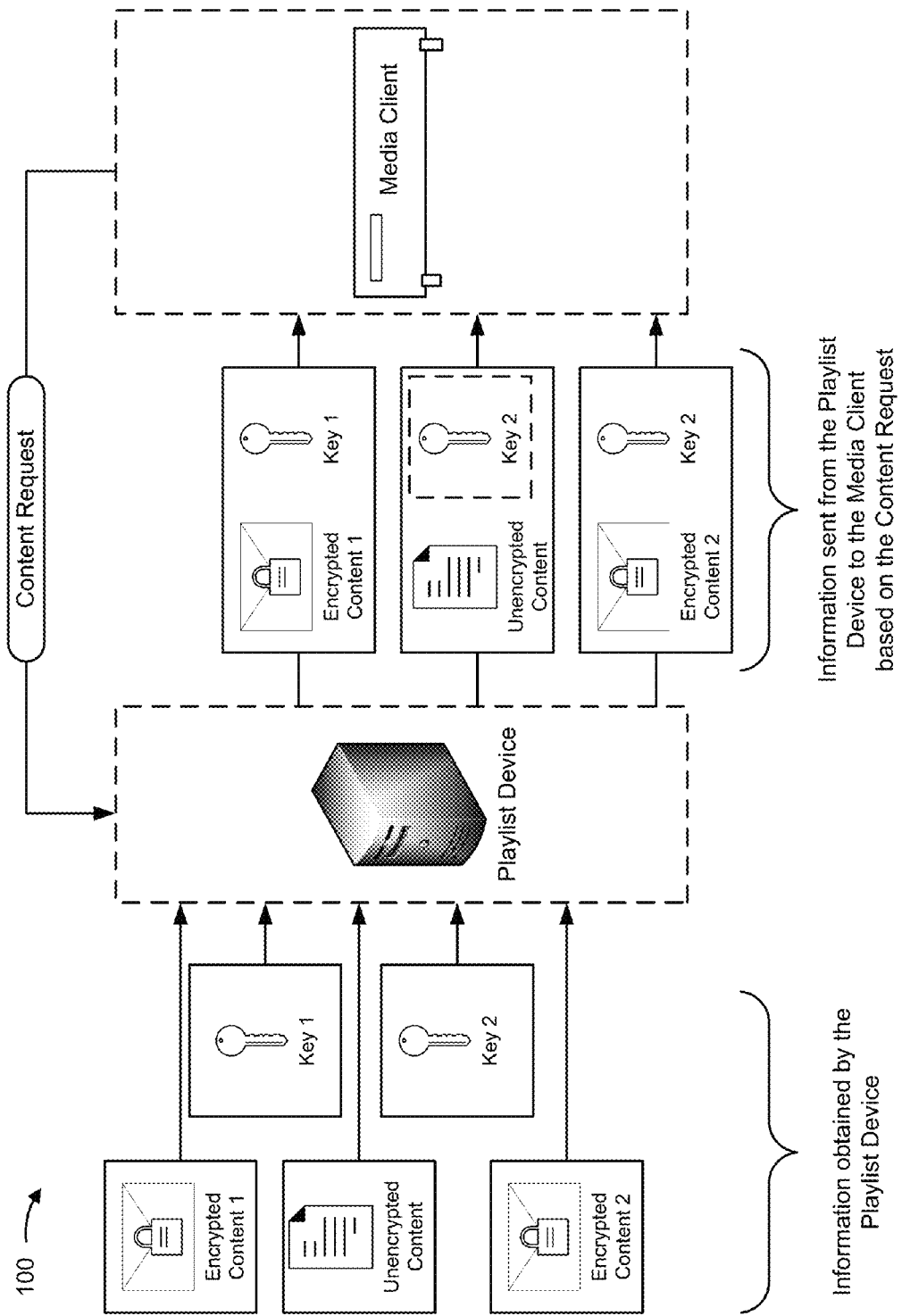
FIG. 1 is a diagram of an overview of an example implementation described herein.

FIG. 1 is a diagram of an overview of an example implementation 100 described herein. A user of a media client (e.g., a set-top box) may direct the media client (e.g., via user input) to play media content. Based on the user input, the media client may send, to a playlist device, a content request. The playlist device may identify and obtain segments of encrypted content (e.g., "Encrypted Content 1" and "Encrypted Content 2") associated with the media client's content request as well as encryption keys (e.g., "Key 1" and "Key 2") associated with the segments of encrypted content. The playlist device may further identify and obtain unencrypted content (e.g., "Unencrypted Content") to be inserted between the segments of encrypted content.

The playlist device may send, to the media client, a first segment of encrypted content ("Encrypted Content 1") and a first encryption key ("Key 1") to enable the media client to decrypt the first segment of encrypted content. The playlist device may then send the segment of unencrypted content ("Unencrypted Content") and a second encryption key ("Key 2") to enable the media client to decrypt a second segment of encrypted content ("Encrypted Content 2") which will follow the unencrypted segment. The playlist device may then send the second segment of encrypted content ("Encrypted Content 2") and the second encryption key ("Key 2").

By receiving the second encryption key with the unencrypted segment, in advance of receiving the second segment of encrypted content associated with the second encryption key, the media client may decrypt the second segment of encrypted content without delay to smoothly transition from the unencrypted segment to the second segment of encrypted content.

Figure 2:
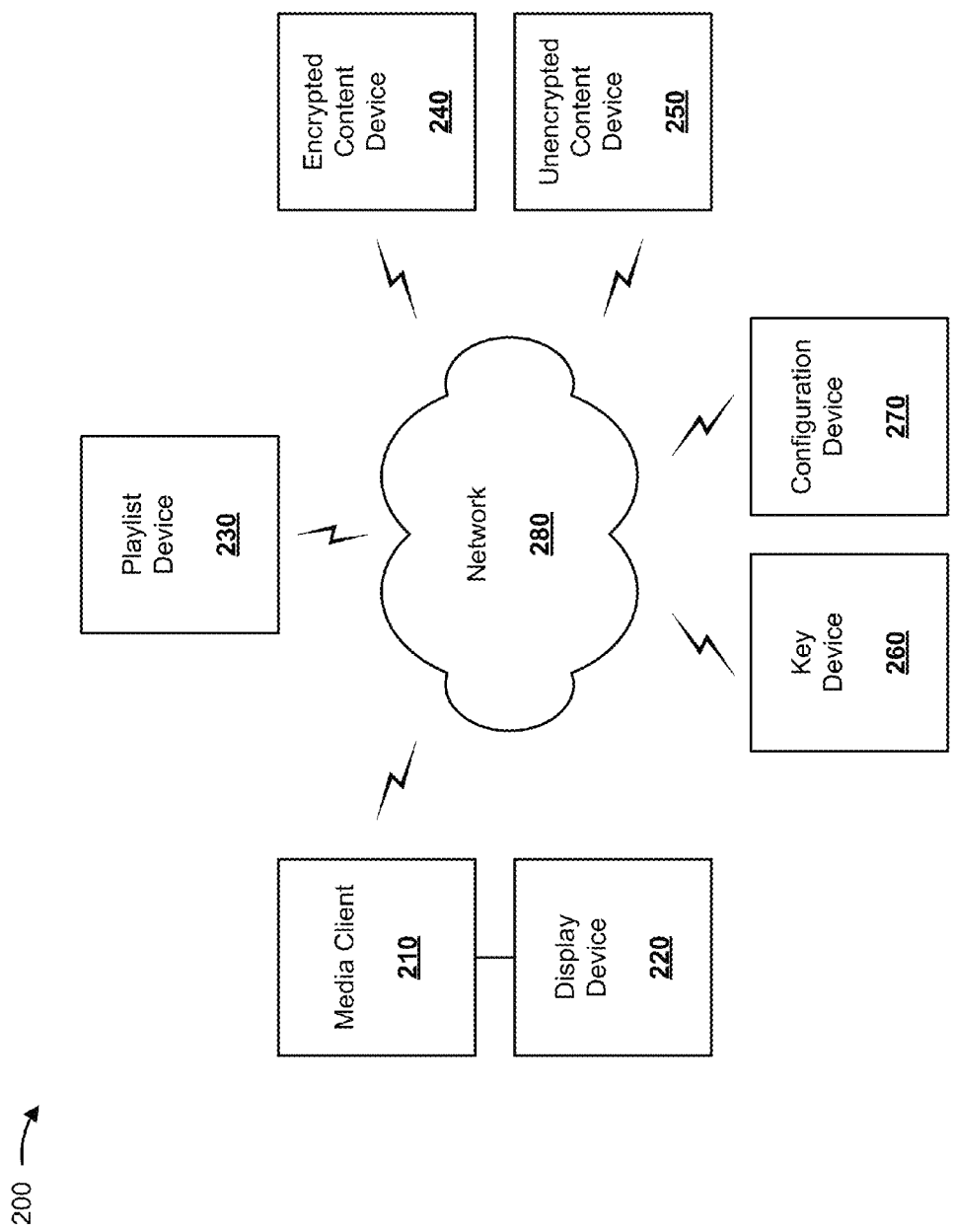
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a media client 210, display device 220, playlist device 230, encrypted content device 240, unencrypted content device 250, key device 260, configuration device 270, and/or network 280. Devices of environment 200 may interconnect via wired connections, wireless connections, or a combination of wired and wireless connections.

Media client 210 may include a device capable of receiving, transmitting, and/or processing multimedia content and providing the multimedia content to a user (e.g., via display device 220). Examples of media client 210 may include a set-top box, a casting stick (e.g., a high-definition media interface (HDMI) dongle), a computer, a cable card, a gaming device, a portable electronic device, and/or another type of device capable of receiving, transmitting, and/or processing multimedia content and providing the multimedia content to a user. For example, media client 210 may communicate with playlist device 230, encrypted content device 240, unencrypted content device 250, configuration device 270, and/or key device 260 in order to play segments or encrypted and/or unencrypted media content.

Display device 220 may include any digital or analog display that is capable of presenting audio and/or video content provided by media client 210. Display device 220 may include one or more display technologies, such as a cathode ray tube (CRT) display, liquid crystal display (LCD), light-emitting diode (LED) display, plasma display, etc. Display device 220 may include a speaker. Examples of display device 220 may include a television, a projector, a computer monitor, and/or another type of device capable of presenting audio and/or video content.

Playlist device 230 may include one or more devices capable of storing, processing, and/or routing information, such as a server and/or a collection of servers. In some implementations, playlist device 230 may include a communication interface that allows playlist device 230 to receive information from and/or transmit information to other devices in environment 200. For example, playlist device 230 may send/receive information to/from media client 210 to provide media client 210 with segments of encrypted media content, encryption keys, and/or unencrypted media content to display the media content to a user of media client 210. Playlist device 230 may send/receive information to/from configuration device 270 to obtain configuration information for providing media client 210 with the media content. Playlist device 230 may send/receive information to/from encrypted content device 240 and/or unencrypted content device 250 to obtain segments of encrypted and/or unencrypted content associated with media client 210. Playlist device 230 may send/receive information to/from key device 260 to obtain one or more encryption keys associated with the segments of encrypted content.

Encrypted content device 240 may include one or more devices capable of storing, processing, and/or routing information, such as a server and/or a collection of servers. In some implementations, encrypted content device 240 may include a communication interface that allows encrypted content device 240 to receive information from and/or transmit information to other devices in environment 200. For example, encrypted content device 240 may send/receive information to/from media client 210 and/or playlist device 230 to provide media client 210 with segments of encrypted content to display to a user of media client 210.

Unencrypted content device 250 may include one or more devices capable of storing, processing, and/or routing information, such as a server and/or a collection of servers. In some implementations, unencrypted content device 250 may include a communication interface that allows unencrypted content device 250 to receive information from and/or transmit information to other devices in environment 200. For example, unencrypted content device 250 may send/receive information to/from media client 210 and/or playlist device 230 to provide media client 210 with segments of unencrypted content to display to a user of media client 210.

Key device 260 may include one or more devices capable of storing, processing, and/or routing information, such as a server and/or a collection of servers. In some implementations, key device 260 may include a communication interface that allows key device 260 to receive information from and/or transmit information to other devices in environment 200. For example, key device 260 may send/receive information to/from media client 210 and/or playlist device 230 to provide media client 210 with encryption keys to decrypt segments of encrypted content and display the decrypted segments to a user of media client 210.

Encrypted content device 250 and key device 260 may be implemented within a single device or a single collection of devices.

Configuration device 270 may include one or more devices capable of storing, processing, and/or routing information, such as a server and/or a collection of servers. In some implementations, configuration device 270 may include a communication interface that allows configuration device 270 to receive information from and/or transmit information to other devices in environment 200. For example, configuration device 270 may send/receive information to/from media client 210 and/or playlist device 230 to enable media client 210 to display segments of encrypted and/or unencrypted content.

Network 280 may include one or more wired and/or wireless networks. For example, network 280 may include a television network, a cellular network (e.g., an LTE network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or another type of network.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
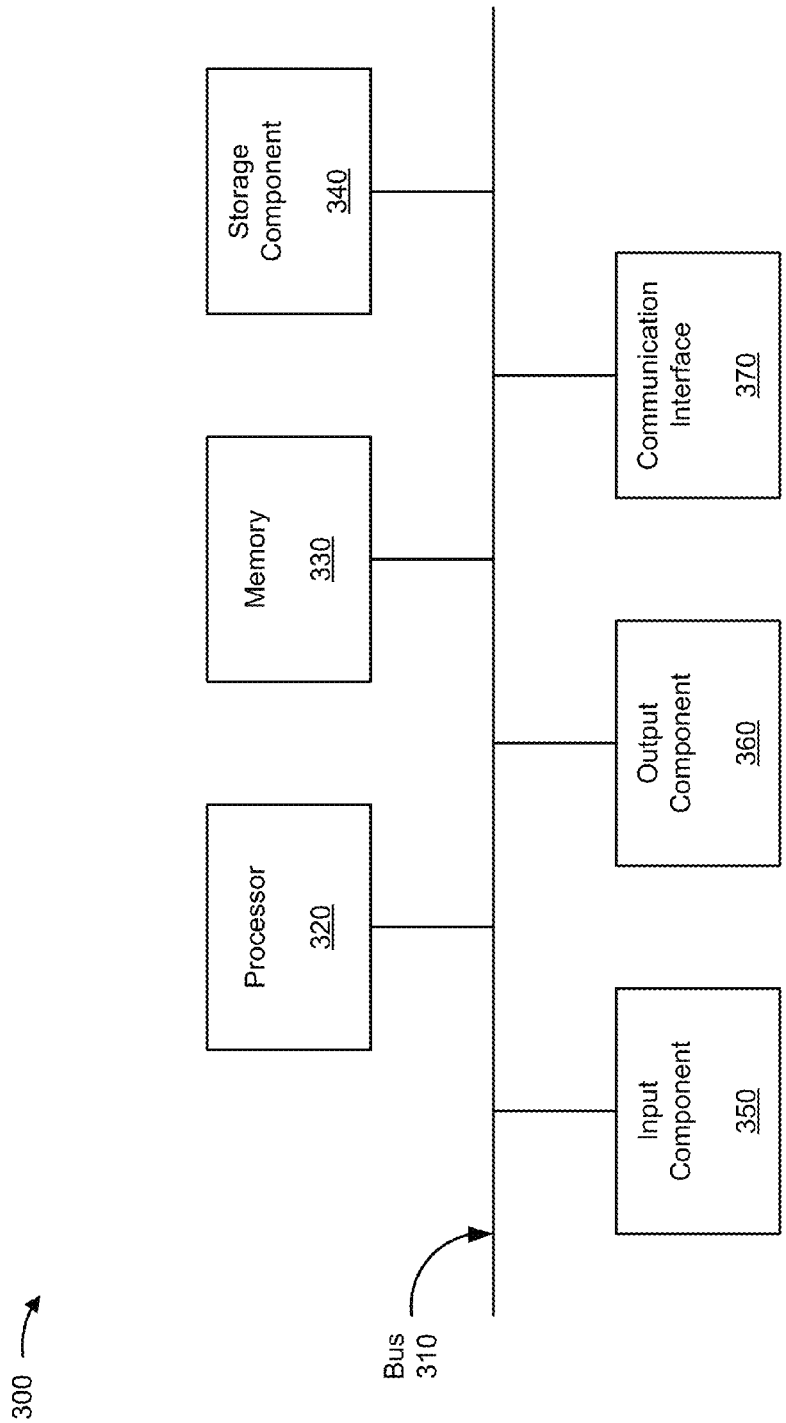
FIG. 3 is a diagram of example components of one or more devices of FIG. 2.

FIG. 3 is a diagram of example components of a device 300. Device 300 may correspond to media client 210, display device 220, playlist device 230, encrypted content device 240, unencrypted content device 250, key device 260, and/or configuration device 270. In some implementations, media client 210, display device 220, playlist device 230, encrypted content device 240, unencrypted content device 250, key device 260, and/or configuration device 270 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
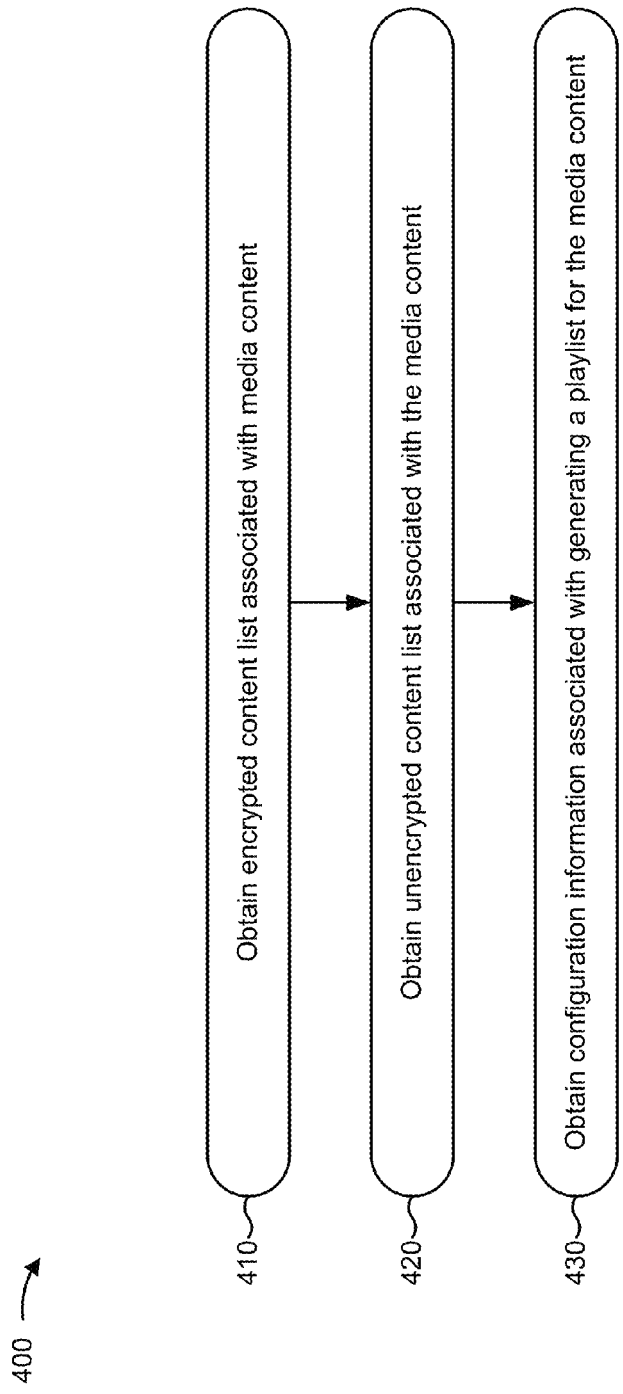
FIG. 4 is a flow chart of an example process for setting up a service for dynamically inserting unencrypted segments of media content between encrypted segments of media content.

FIG. 4 is a flow chart of an example process 400 for setting up a service for dynamically inserting unencrypted segments of media content between encrypted segments of media content. In some implementations, one or more process blocks of FIG. 4 may be performed by playlist device 230. Additionally, or alternatively, one or more process blocks of FIG. 4 may be performed by another device or a group of devices separate from or including playlist device 230, such as media client 210, encrypted content device 240, unencrypted content device 250, key device 260, and/or configuration device 270.

As shown in FIG. 4, process 400 may include obtaining an encrypted content list associated with media content (block 410). For example, playlist device 230 may receive, from encrypted content device 240, a list of encrypted content. The list of encrypted content may identify (e.g., using a content identifier) one or more encrypted segments of broadcast and/or on-demand audio and/or video content. For example, the one or more segments may form a song, television show, and/or film—or a collection of songs, television shows, and/or films. The list of encrypted content may further identify (e.g., using a key identifier) one or more encryption keys associated with the one or more encrypted segments. The list of encrypted content may further identify one or more properties associated with the one or more encrypted segments. For example, a property may include content and/or demographic information associated with a particular segment and/or collection of segments of encrypted content to match the particular segment and/or collection of segments to one or more advertisements.

As further shown in FIG. 4, process 400 may include obtaining an unencrypted content list associated with the media content (block 420). For example, playlist device 230 may receive, from unencrypted content device 250, a list of unencrypted content. The list of unencrypted content may identify (e.g., using a content identifier) one or more unencrypted segments of broadcast and/or on-demand audio and/or video content. For example, the one or more unencrypted segments may form an advertisement (or a collection of advertisements), a transition segment (e.g., a loading screen, blank screen, network audio/visual display, trailer, preview, etc.), an interactive media segment (e.g., for user input indicating a desire to continue playing and/or change content), or the like. The list of unencrypted content may further identify (e.g., using a property identifier) one or more properties associated with the one or more unencrypted segments. For example, a property may include content and/or demographic information associated with a segment of unencrypted content to match a particular advertisement, contained within the unencrypted segment, to a particular segment of encrypted content, to a particular media client 210, and/or to a particular user associated with the media client 210.

As further shown in FIG. 4, process 400 may include obtaining configuration information associated with generating a playlist for the media content (block 430). For example, playlist device 230 may receive configuration information from configuration device 270. The configuration information may identify one or more properties associated with a media client 210 and/or a user of the media client 210. For example, a property may include content and/or demographic information associated with a particular media client 210 and/or a particular user to match an advertisement to the particular media client 210, and/or user.

In this way, playlist device 230 may obtain information for identifying encrypted and unencrypted segments of media content associated with a service for dynamically inserting the unencrypted segments of media content between the encrypted segments of media content.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
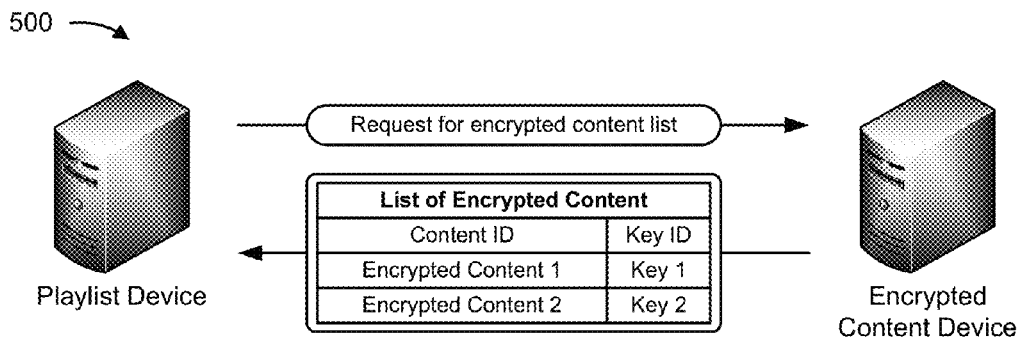
FIGS. 5A-C are diagrams of an example implementation relating to the example process shown in FIG. 4.
Figure 5B:
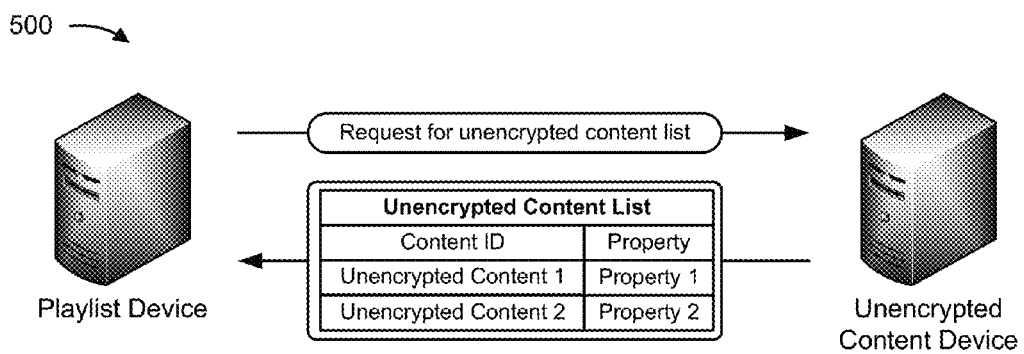
Figure 5C:
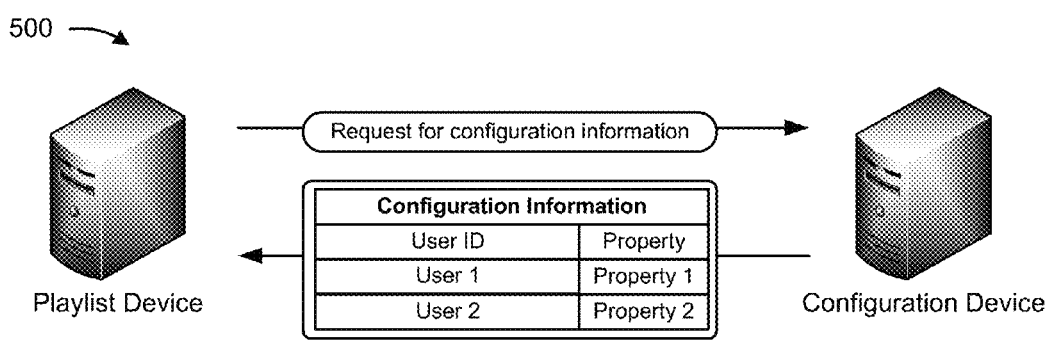

FIGS. 5A-5C are diagrams of an example implementation 500 relating to example process 400 shown in FIG. 4. FIGS. 5A-5C show an example of setting up a service for dynamically inserting unencrypted segments of media content between encrypted segments of media content.

As shown in FIG. 5A, assume, for example implementation 500, that a playlist device (e.g., playlist device 230) sends a request for an encrypted content list to an encrypted content device (e.g., encrypted content device 240). Assume further that the encrypted content device sends, based on the playlist device's request, a list of encrypted content which includes content identifiers for two segments of encrypted content ("Encrypted content 1" and "Encrypted Content 2")

and key identifiers associated with the two segments of encrypted content ("Key 1" associated with "Encrypted Content 1" and "Key 2" associated with "Encrypted Content 2").

As shown in FIG. 5B, assume, for example implementation 500, that the playlist device (e.g., playlist device 230) sends a request for an unencrypted content list to an unencrypted content device (e.g., unencrypted content device 250). Assume further that the unencrypted content device sends, based on the playlist device's request, a list of unencrypted content which includes content identifiers for two segments of unencrypted content ("Unencrypted content 1" and "Unencrypted Content 2") and identifies properties associated with the two segments of unencrypted content ("Property 1" associated with "Unencrypted Content 1" and "Property 2" associated with "Unencrypted Content 2").

As shown in FIG. 5C, assume, for example implementation 500, that the playlist device (e.g., playlist device 230) sends a request for configuration information to a configuration device (e.g., configuration device 270). Assume further that the configuration device sends, based on the playlist device's request, configuration information which includes user identifiers ("User 1" and "User 2") and identifies properties associated with the users ("Property 1" associated with "User 1" and "Property 2" associated with "User 2").

As indicated above, FIGS. 5A-5C are provided merely as an example. Other examples are possible and may differ from what was described with regard to FIGS. 5A-5C.

Figure 6:
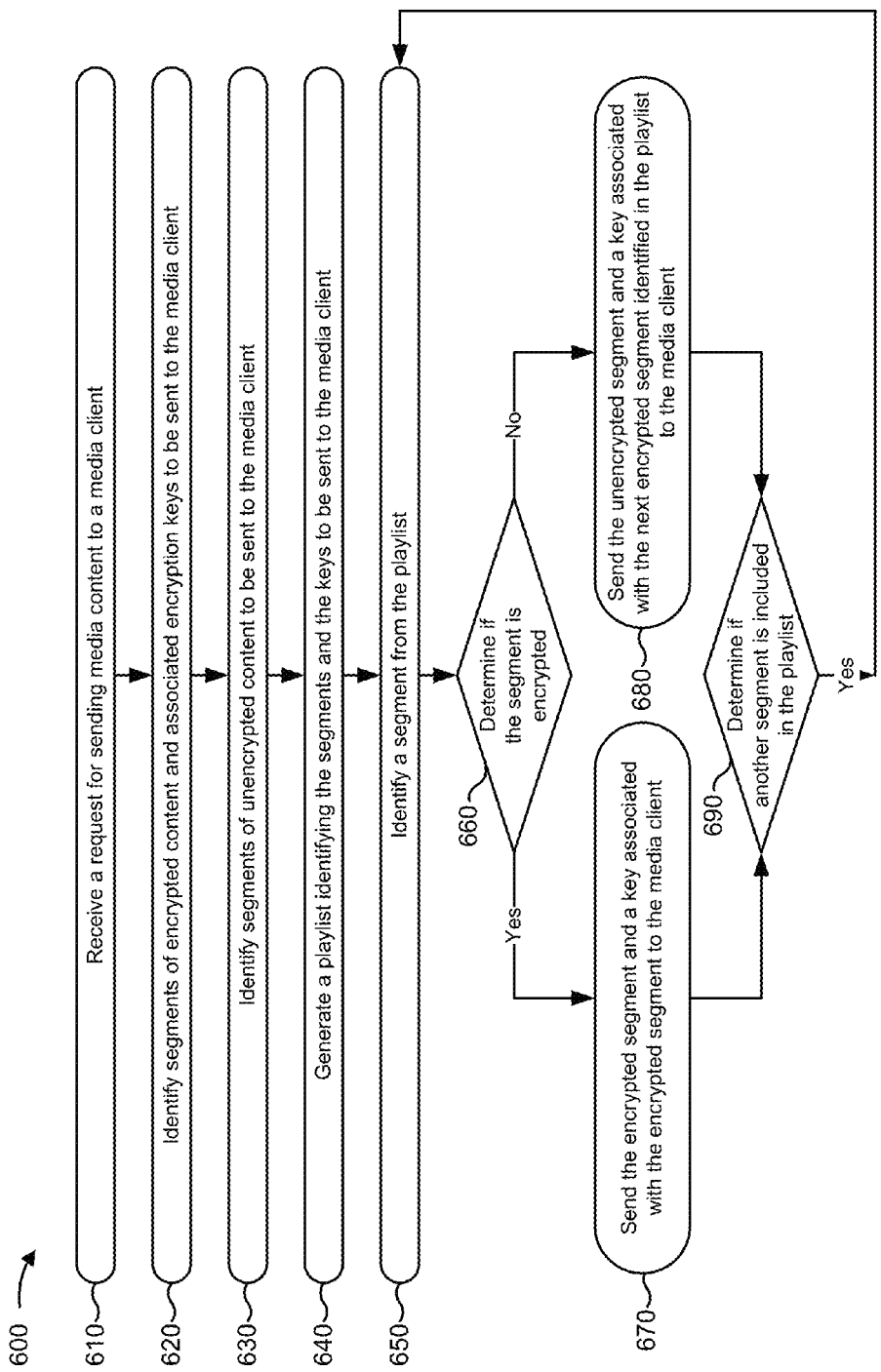
FIG. 6 is a flow chart of an example process for operating a service for dynamically inserting unencrypted segments of media content between encrypted segments of media content.

FIG. 6 is a flow chart of an example process 600 for operating a service for dynamically inserting unencrypted segments of media content between encrypted segments of media content. In some implementations, one or more process blocks of FIG. 6 may be performed by playlist device 230. In some implementations, one or more process blocks of FIG. 6 may be performed by another device or a group of devices separate from or including playlist device 230, such as media client 210, encrypted content device 240, unencrypted content device 250, key device 260, and/or configuration device 270.

As shown in FIG. 6, process 600 may include receiving a request for sending media content to a media client (block 610). For example, playlist device 230 may receive a request for media content from media client 210. Media client 210 may send the request based on, e.g., user input directing media client 210 to play media content. The request may include information for identifying media content associated with the request (e.g., by identifying a broadcast and/or on-demand service, a time, a media identifier, or the like). Additionally, or alternatively, the request may identify media client 210 and/or a user associated with media client 210.

As further shown in FIG. 6, process 600 may include identifying segments of encrypted content and associated encryption keys to be sent to the media client (block 620). For example, playlist device 230 may obtain (e.g., by sending a query, based on the media client's request for media content, to encrypted content device 240) an encrypted content list identifying segments of encrypted media content to be sent to media client 210. Playlist device 230 may further identify, from the encrypted content list, encryption keys associated with decrypting the segments of encrypted media content (e.g., by querying encrypted content device 240 and/or key device 260).

As further shown in FIG. 6, process 600 may include identifying segments of unencrypted content to be sent to the media client (block 630). For example, playlist device 230 may obtain (e.g., by sending a query, based on media client 210's request for media content, to unencrypted content device 250 and/or configuration device 270) segments of unencrypted media content to be inserted between the segments of encrypted content and sent to media client 210 (e.g., by matching properties associated with the unencrypted segments, contained in an unencrypted content list obtained from unencrypted content device 250, with properties associated with media client 210 and/or the user of media client 210, contained in configuration information obtained from configuration device 270).

As further shown in FIG. 6, process 600 may include generating a playlist identifying the segments and the keys to be sent to the media client (block 640). For example, playlist device 230 may generate a playlist identifying and sorting the segments of encrypted content and unencrypted content to be sent to media client 210. Playlist device 230 may sort the segments of content according to an order, e.g., determined based on the encrypted content list, the unencrypted content list, and/or the configuration information. The playlist may further identify the encryption keys associated with decrypting the segments of encrypted content.

As further shown in FIG. 6, process 600 may include identifying a segment from the playlist (block 650) and determining if the identified segment is encrypted (block 660). For example, playlist device 230 may identify, from the playlist, a current segment of media content to be sent to media client 210. Playlist device 230 may determine if a segment is encrypted based on information contained within the playlist (e.g., by associating an entry for the segment with an encryption identifier), information contained within the segment itself (e.g., a file header, extension, or the like), and/or based on identifying an entry for the segment in the encrypted content list.

As further shown in FIG. 6, when the identified segment is encrypted (block 660-YES), process 600 may include sending the encrypted segment, and a key associated with the encrypted segment, to the media client (block 670). For example, playlist device 230 may obtain the encrypted segment from encrypted content device 240 and may send the encrypted segment to media client 210. Alternatively, or additionally, playlist device 230 may direct encrypted content device 240 to send the encrypted segment to media client 210 (e.g., by sending a query to encrypted content device 240 identifying media client 210 and the encrypted segment to be sent). Likewise, playlist device 230 may obtain an encryption key, associated with the identified encrypted segment, from key device 260 and send the encryption key to media client 210. Alternatively, or additionally, playlist device 230 may direct key device 260 to send the encryption key to media client 210 (e.g., by sending a query to key device 260 identifying media client 210 and the key to be sent). The encryption key sent to media client 210 and/or playlist device 230 may itself be encrypted (e.g., within an ECM) and may be decrypted by media client 210 (e.g., by passing the encrypted key through a CAM). In this way, media client 210 may receive encrypted content associated with the request, decrypt the encrypted content using the encryption key, and play the decrypted content for a user of media client 210.

As further shown in FIG. 6, when the identified segment is not encrypted (block 660-NO), process 600 may include sending the unencrypted segment, and a key associated with the next encrypted segment identified in the playlist, to the media client (block 680). For example, playlist device 230 may obtain the unencrypted segment from content device 250 and may send the unencrypted segment to media client

210. Alternatively, or additionally, playlist device 230 may direct unencrypted content device 250 to send the identified unencrypted segment to media client 210 (e.g., by sending a query to unencrypted content device 250 identifying media client 210 and the unencrypted segment to be sent). Likewise, playlist device 230 may obtain an encryption key, associated with the next encrypted segment identified in the playlist, from key device 260 and send the encryption key to media client 210. Alternatively, or additionally, playlist device 230 may direct key device 260 to send the encryption key to media client 210 (e.g., by sending a query to key device 260 identifying media client 210 and the key to be sent). The encryption key sent to media client 210 and/or playlist device 230 may itself be encrypted (e.g., within an ECM) and may be decrypted by media client 210 (e.g., by passing the encrypted key through a CAM). In this way, media client 230 may prepare to decrypt subsequent encrypted content while playing unencrypted content associated with the request.

As further shown in FIG. 6, process 600 may include determining if another segment is included in the playlist (block 690), and, if so, process 600 may return to block 650 to identify a next segment in the playlist. For example, playlist device 230 may, for each segment identified in the playlist, determine whether the segment is encrypted or unencrypted and send the segment, along with an appropriate encryption key, to media client 210. Playlist device 230 may modify the playlist based on a subsequent request from media client 210 (e.g., requesting a different media service, content, or the like). In this way, playlist device 230 may send, to media client 210, the segments of media content associated with one or more requests from media client 210.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIGS. 7A-7D are diagrams of an example implementation 700 relating to example process 600 shown in FIG. 6. FIGS. 7A-7D show an example of operating a service for dynamically inserting unencrypted segments of media content between encrypted segments of media content. Assume, for example implementation 700, that the service has been set up according to example implementation 500 described above with respect to FIGS. 5A-5C.

Figure 7A:
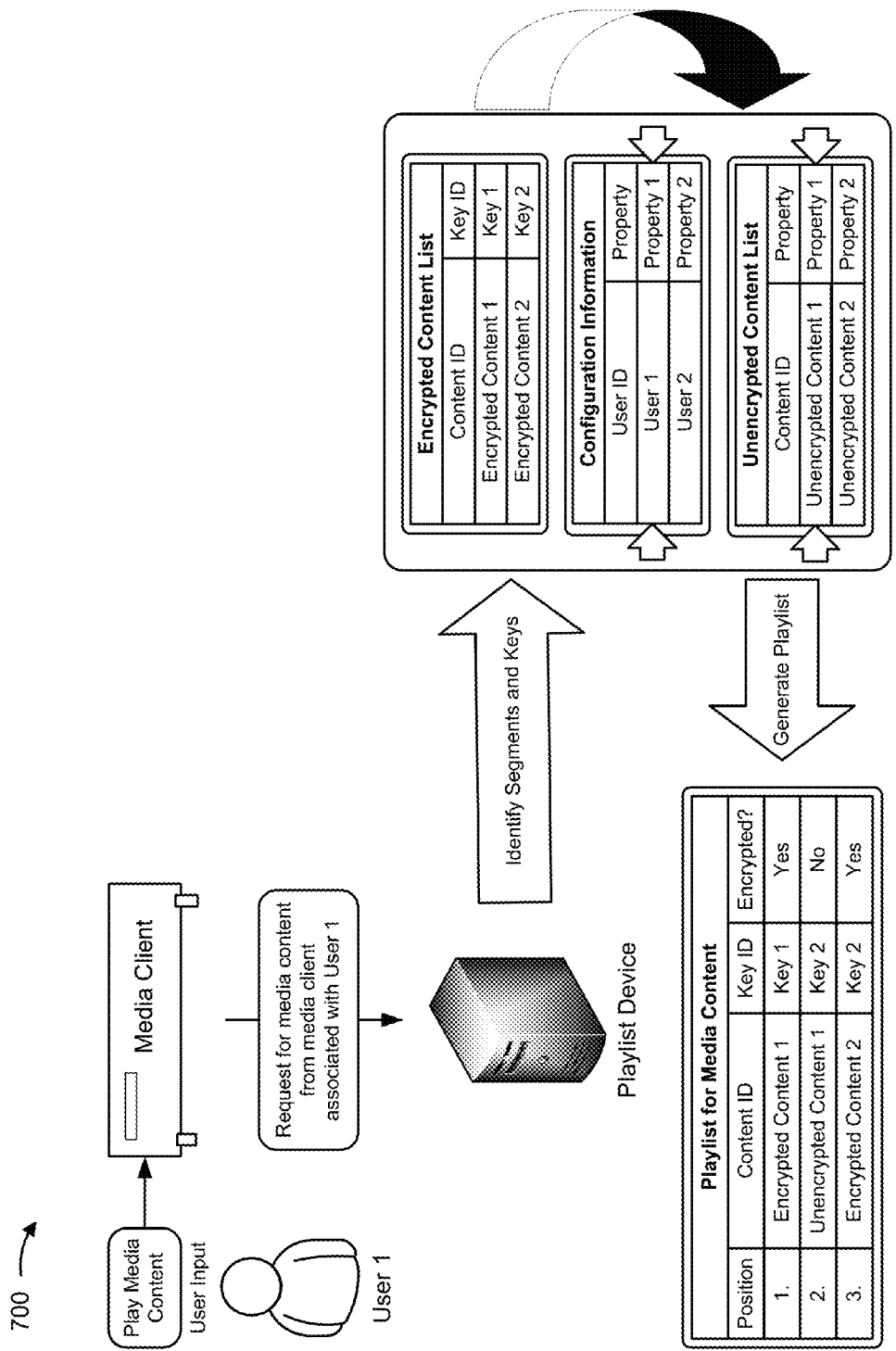
FIGS. 7A-D are diagrams of an example implementation relating to the example process shown in FIG. 6.

As shown in FIG. 7A, assume, for example implementation 700, that a media client (e.g., media client 210) associated with a first user ("User 1") sends, to a playlist device (e.g., playlist device 230), a request for media content based on user input directing the media client to play the media content. The playlist device may identify segments of media content and encryption keys associated with the media client's request for the media content.

Assume that the playlist device identifies an encrypted content list, obtained from an encrypted content device (e.g., encrypted content device 240), which identifies two encrypted segments ("Encrypted Content 1" and "Encrypted Content 2") and two corresponding encryption keys ("Key 1" and "Key 2") associated with the requested media content. Assume further that the playlist device identifies, from configuration information received from a configuration device (e.g., configuration device 270), a first property ("Property 1") associated with the first user ("User 1") and a second property ("Property 2") associated with a second user ("User 2"). Assume further that the playlist device identifies an unencrypted content list, obtained from an unencrypted content device (e.g., unencrypted content device 250), which identifies a first segment of unencrypted content ("Unencrypted Content 1") associated with the first property ("Property 1") and a second segment of unencrypted content ("Unencrypted Content 2") associated with the second property ("Property 2").

Assume further that the playlist device determines that the first segment of unencrypted content is associated with the first user based on the first property being associated with both of the first user and the first unencrypted segment. Assume that the playlist device generates a playlist identifying the first segment of unencrypted content inserted between the two segments of encrypted content, including encryption identifiers indicating whether the segments are encrypted or unencrypted and key identifiers for encryption keys to be sent with the segments. Based on the first segment unencrypted content being included at a position in the playlist immediately before the second segment of encrypted content, the first segment of unencrypted content may be associated with the second key. In this way, the playlist device may generate a playlist for responding to the media client's request for media content.

Figure 7B:
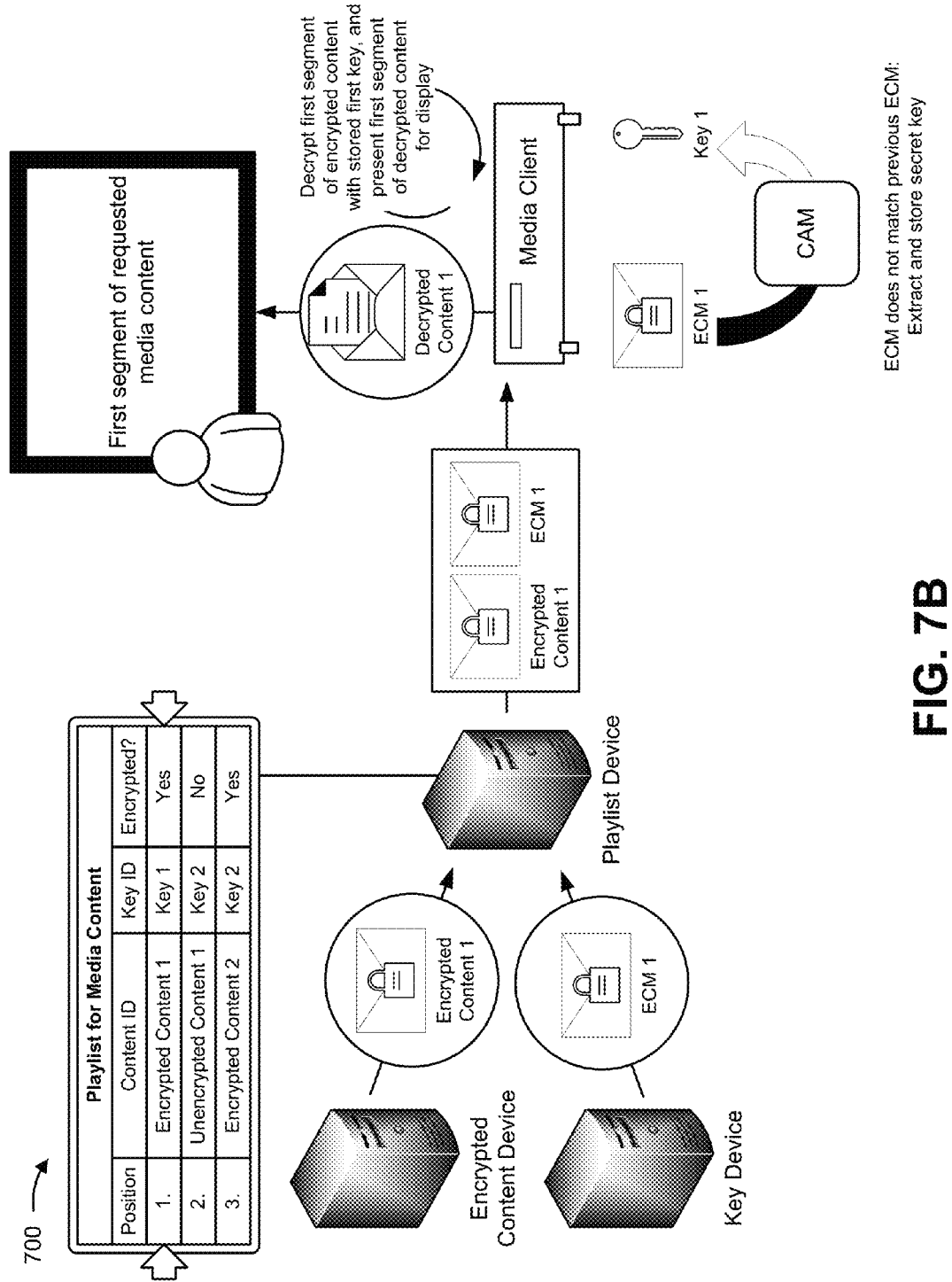

As shown in FIG. 7B, assume, for example implementation 700, that the playlist device (e.g., playlist device 230) identifies, from a first position in the playlist, the first encrypted segment ("Encrypted Content 1") and the first encryption key ("Key 1") associated with the first encrypted segment. Assume further that the playlist device requests and receives, from the encrypted content device (e.g., encrypted content device 240), the first encrypted segment ("Encrypted Content 1"). Assume further that the playlist device requests and receives, from a key device (e.g., key device 260), a first ECM ("ECM 1") containing the first encrypted key ("Key 1") associated with the first encrypted segment.

Assume that the playlist device sends, to the media client (e.g., media client 210) associated with the first user ("User 1"), a first response including the first encrypted segment ("Encrypted Content 1") and the first ECM ("ECM 1"). Assume further that the media client determines that the first ECM does not match a previous ECM (or that no previous ECM exists) and thus decrypts the first ECM ("ECM 1") using a CAM, associated with the media client, to obtain and store the first encryption key ("Key 1"). Assume further that the media client decrypts the first encrypted segment ("Encrypted Content 1"), using the first encryption key ("Key 1"), and presents the decrypted first segment ("Decrypted Content 1") for display to the user (e.g., via display device 220) as the first segment of the requested media content.

Figure 7C:
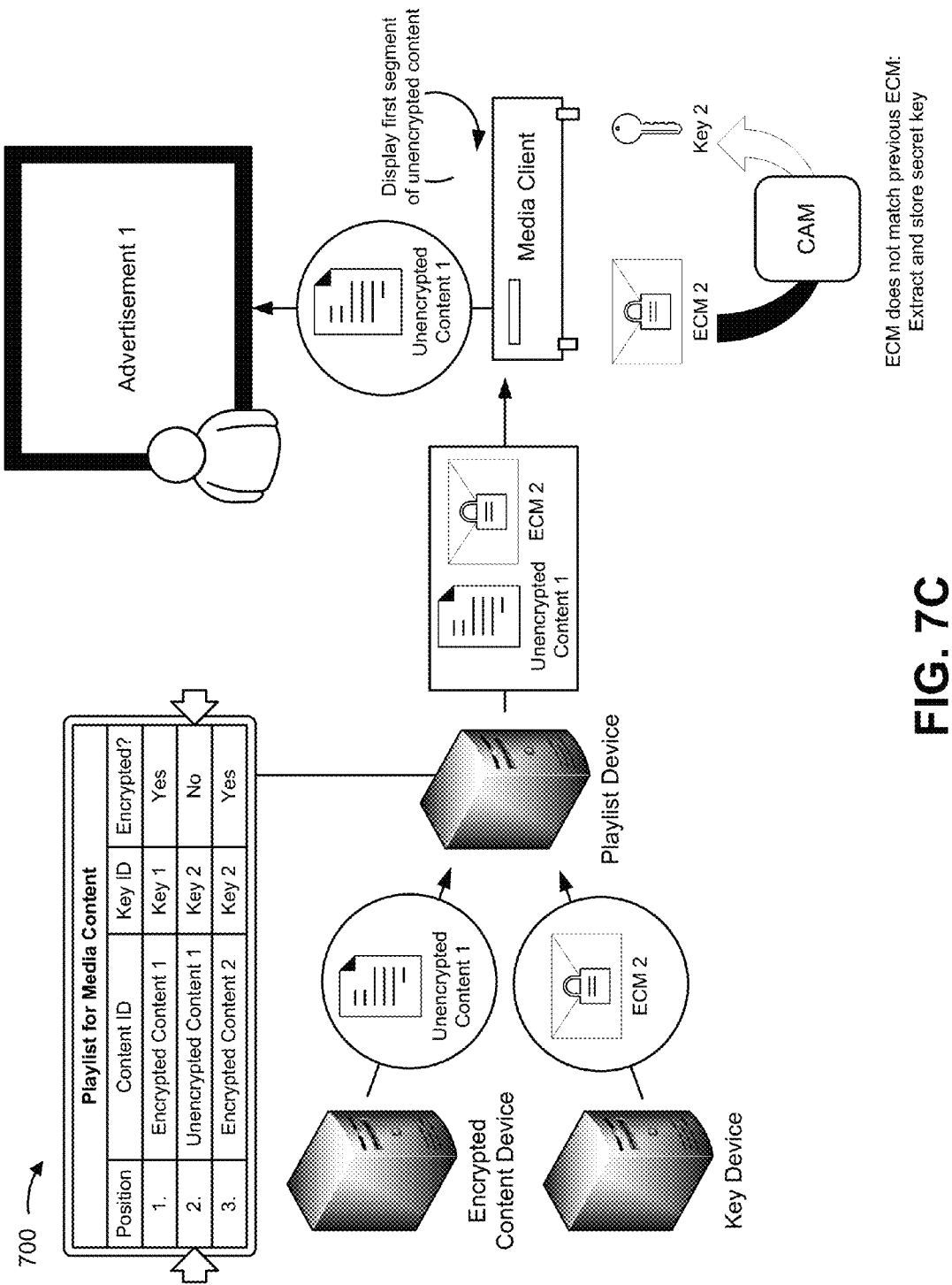

As shown in FIG. 7C, assume, for example implementation 700, that the playlist device (e.g., playlist device 230) identifies, from a second position in the playlist, the first unencrypted segment ("Unencrypted Content 1") and the second encryption key ("Key 2") associated with the second encrypted segment ("Encrypted Content 2") which follows the first unencrypted segment. Assume further that the playlist device requests and receives, from the unencrypted content device (e.g., unencrypted content device 250), the first unencrypted segment ("Unencrypted Content 1"). Assume further that the playlist device requests and receives, from the key device (e.g., key device 260), a second ECM ("ECM 2") containing the second encrypted key ("Key 2") associated with the second encrypted segment.

Assume that the playlist device sends, to the media client (e.g., media client 210) associated with the first user ("User 1"), a second response including the first unencrypted segment ("Unencrypted Content 1") and the second ECM ("ECM 2"). Assume further that the media client presents the first unencrypted segment ("Unencrypted Content 1") for display to the user (e.g., via display device 220) as a first advertisement ("Advertisement 1"). Assume further that the media client determines that the second ECM does not match a previous ECM (e.g., the first ECM) and thus decrypts the second ECM ("ECM 2") using a CAM, associated with the media client, to obtain and store the second encryption key ("Key 2").

Figure 7D:
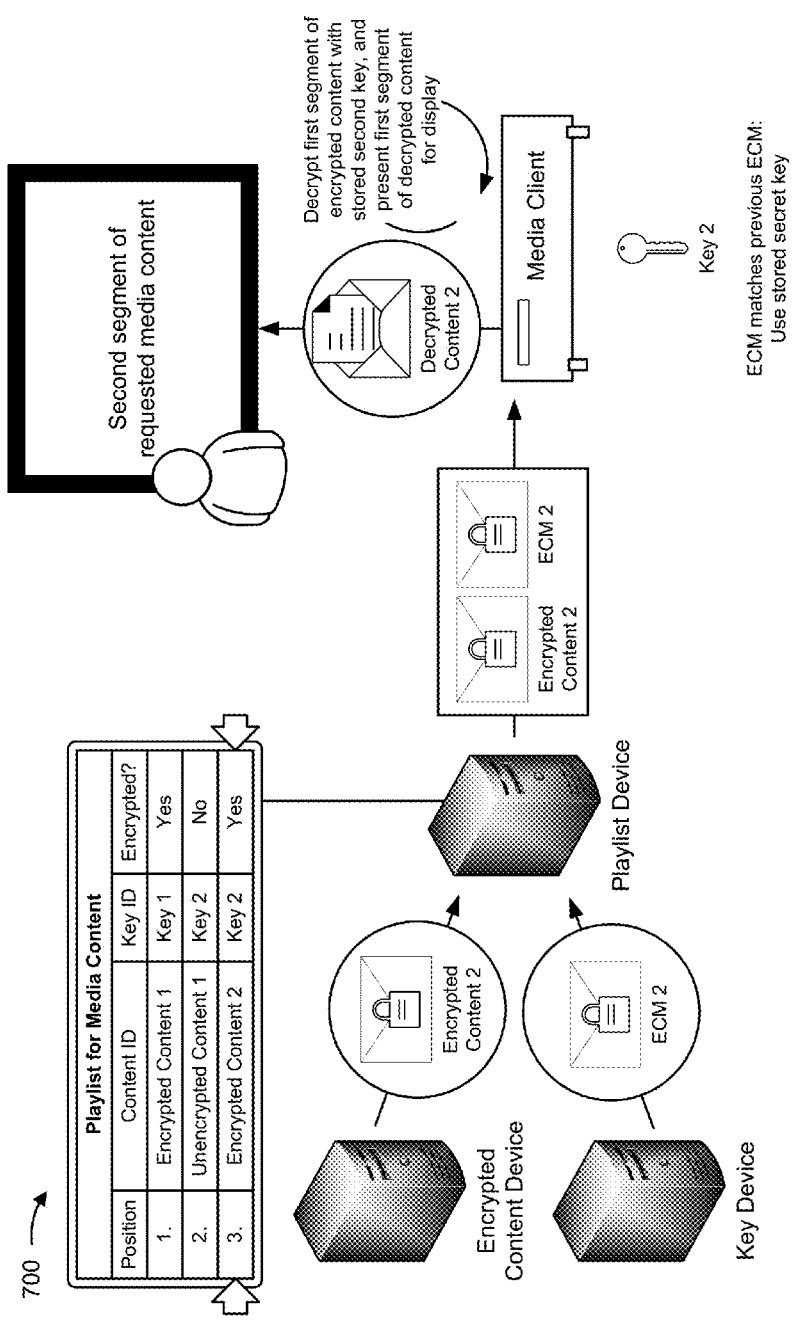

As shown in FIG. 7D, assume, for example implementation 700, that the playlist device (e.g., playlist device 230) identifies, from a third position in the playlist, the second encrypted segment ("Encrypted Content 2") and the second encryption key ("Key 2") associated with the second encrypted segment. Assume further that the playlist device requests and receives, from the encrypted content device (e.g., encrypted content device 240), the second encrypted segment ("Encrypted Content 2"). Assume further that the playlist device requests and receives, from the key device (e.g., key device 260), a second ECM ("ECM 2") containing the second encrypted key ("Key 2") associated with the second encrypted segment.

Assume that the playlist device sends, to the media client (e.g., media client 210) associated with the first user ("User 1"), a third response including the second encrypted segment ("Encrypted Content 2") and the second ECM ("ECM 2"). Assume further that the media client determines that the second ECM received with the second encrypted segment matches the second ECM previously received with the first segment of unencrypted content. Assume further that, based on this determination, the media client decrypts the second encrypted segment ("Encrypted Content 2"), using the previously stored second encryption key ("Key 2"), and presents the decrypted second segment ("Decrypted Content 2") for display to the user (e.g., via display device 220) as the second segment of the requested media content. In this way, the media client may decrypt and display the second encrypted segment without delay by decrypting and storing the second encryption key in advance of receiving the second encrypted segment.

As indicated above, FIGS. 7A-7D are provided merely as an example. Other examples are possible and may differ from what was described with regard to FIGS. 7A-7D.

Implementations described herein may assist a media client in playing encrypted segments of media content with dynamically inserted unencrypted content while maintaining a smooth transition from an unencrypted segment to an encrypted segment.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors, at least partially implemented in hardware, to:
receive, from a media client, a request for media content;
identify a first encrypted media content and a second encrypted media content, based on the request for media content, to be sent to the media client;
identify a first encrypted key, associated with decrypting the first encrypted media content, to be sent to the media client;
send, to the media client, a first message including the first encrypted media content and the first encrypted key,
the first encrypted key being decrypted to produce a first encryption key;
determine unencrypted media content, based on the request for media content, to be sent to the media client before sending the second encrypted media content;
send, to the media client, a second message including a second encrypted key, associated with decrypting the second encrypted media content, and the unencrypted media content,
the second encrypted key being compared with the first encrypted key, the second encrypted key being decrypted to produce a second encryption key based on determining the second encrypted key does not match the first encrypted key, and the second encryption key being stored based on the second encrypted key being decrypted; and send, to the media client, a third message, after the second message, including the second encrypted media content and a third encrypted key associated with decrypting the second encrypted media content, the third encrypted key being compared with the second encrypted key, and the stored second encryption key being used to decrypt the second encrypted media content based on determining the third encrypted key matches the second encrypted key.

2. The device of claim 1, where the one or more processors are further to:

generate a playlist, the playlist identifying:
the first encrypted media content in a first entry,
the unencrypted media content and the second encrypted key in a second entry, and
the second encrypted media content and the third encrypted key in a third entry; and where the one or more processors, when sending the second and third messages, are to:
send, to the media client, the second message based on identifying, in the second entry in the playlist, the second encrypted key and the unencrypted media content; and
send, to the media client, the third message based on identifying, in the third entry in the playlist, the third encrypted key and the second encrypted media content.

3. The device of claim 1, where the one or more processors are further to:

obtain a list of encrypted content associated with the request; and where the one or more processors, when identifying the first encrypted media content, are to:
identify, from the list of encrypted content, the first encrypted media content.

4. The device of claim 3, where the one or more processors, when identifying the first encrypted key, are to:
identify, from the list of encrypted content, the first encrypted key associated with the first encrypted media content.

5. The device of claim 1, where the one or more processors are further to:

obtain a list of unencrypted content identifying one or more segments of unencrypted media content and one or more properties associated with the one or more segments of unencrypted media content; and where the one or more processors, when determining the unencrypted media content to be sent to the media client, are to:
determine the unencrypted media content to be sent to the media client based on comparing a property associated with the media client to the one or more properties identified in the list of unencrypted content.

6. The device of claim 1, where
the second and third encrypted keys are encrypted encryption keys to be decrypted by the media client.

7. The device of claim 1, where sending the second encrypted key with the unencrypted media content reduces an amount of time associated with transitioning from the unencrypted media content to the second encrypted media content.

8. A computer-readable medium storing instructions, the instructions comprising:

one or more instructions that, when executed by one or more processors, cause the one or more processors to:
receive, from a media client, a request for media content;
identify a first encrypted media content and a second encrypted media content, based on the request for the media content, to be sent to the media client;
identify a first encrypted key, associated with the first encrypted media content, to be sent to the media client for decrypting the first encrypted media content;
identify unencrypted media content to be sent to the media client;
determine an order for sending, to the media client, the first encrypted media content, the second encrypted media content, and the unencrypted media content;
send, to the media client, a first message including the first encrypted media content, according to the order for sending, along with the first encrypted key associated with the first encrypted media content,
the first encrypted key being decrypted to produce a first encryption key;
send, to the media client, a second message including the unencrypted media content, along with a second encrypted key associated with the second encrypted media content, according to the order for sending,
the second encrypted key being compared with the first encrypted key,
the second encrypted key being decrypted to produce a second encryption key based on determining the second encrypted key does not match the first encrypted key, and
the second encryption key being stored based on the second encrypted key being decrypted; and
send, to the media client, a third message, after the second message,
the third message including the second encrypted media content and a third encrypted key associated with decrypting the second encrypted media content,
the third encrypted key being compared with the second encrypted key, and
the stored second encryption key being used to decrypt the second encrypted media content based on determining the third encrypted key matches the second encrypted key.

9. The computer-readable medium of claim 8, where the one or more instructions, when executed by the one or more processors, further cause the one or more processors to:
obtain a list of encrypted content associated with the request;
where the one or more instructions, that cause the one or more processors to identify the first encrypted media content and the second encrypted media content, cause the one or more processors to:
identify, from the list of encrypted content, the first encrypted media content and the second encrypted media content; and
identify, from the list of encrypted content, an encrypted content order associated with the first encrypted media content and the second encrypted media content; and where the one or more instructions, that cause the one or more processors to determine the order for sending, cause the one or more processors to:
determine the order for sending the first encrypted media content and the second encrypted media content based on the encrypted content order.

10. The computer-readable medium of claim 8, where the one or more instructions, when executed by the one or more processors, further cause the one or more processors to:
identify, from a list of encrypted content, one or more insertion points between the first encrypted media content and the second encrypted media content; and
where the one or more instructions, that cause the one or more processors to determine the order for sending, cause the one or more processors to:
determine the order for sending based on inserting the unencrypted media content into the one or more insertion points between the first encrypted media content and the second encrypted media content.

11. The computer-readable medium of claim 8, where the one or more instructions, when executed by the one or more processors, further cause the one or more processors to:
identify a property associated with the media client; and
where the one or more instructions, that cause the one or more processors to identify the unencrypted media content, cause the one or more processors to:
identify the unencrypted media content based on the property associated with the media client.

12. The computer-readable medium of claim 8, where the one or more instructions, when executed by the one or more processors, further cause the one or more processors to:
identify a property associated with the first encrypted media content and the second encrypted media content; and
where the one or more instructions, that cause the one or more processors to identify the unencrypted media content, cause the one or more processors to:
identify the unencrypted media content based on the property associated with the first encrypted media content and the second encrypted media content.

13. The computer-readable medium of claim 8, where the one or more instructions, when executed by the one or more processors, further cause the one or more processors to:
generate a playlist, the playlist identifying:
the first encrypted media content,
the second encrypted media content,
the first encrypted key to be sent with the first encrypted media content,
the unencrypted media content,
the second encrypted key to be sent with the unencrypted media content,
the third encrypted key to be sent with the second encrypted media content, and
the order for sending; and
send to the media client and according to the playlist:
the first encrypted media content with the first encrypted key,
the unencrypted media content with the second encrypted key, and
the second encrypted media content with the third encrypted key.

14. The computer-readable medium of claim 8, where sending the second encrypted key with the unencrypted media content reduces communication interferences that scramble video content associated with the media content.

15. A method, comprising:
receiving, by a device from a media client, a request for sending media content to the media client;
identifying, by the device, first and second encrypted media content to be sent to the media client;
identifying, by the device, a first encrypted key, associated with decrypting the first encrypted media content, to be sent to the media client;
sending, by the device and to the media client, a first message including the first encrypted media content with the first encrypted key,
the first encrypted key being decrypted to produce a first encryption key;
determining, by the device, unencrypted media content to be sent to the media client;
sending, by the device and to the media client, a second message including the unencrypted media content and a second encrypted key, associated with decrypting the second encrypted media content,
the second encrypted key being compared with the first encrypted key,
the second encrypted key being decrypted to produce a second encryption key based on determining the second encrypted key does not match the first encrypted key, and
the second encryption key being stored based on the second encrypted key being decrypted; and
sending, by the device to the media client, a third message including the second encrypted media content and a third encrypted key, associated with decrypting the second encrypted media content, after sending the unencrypted media content with the second encrypted key,
the third encrypted key being compared with the second encrypted key, and
the stored second encryption key being used to decrypt the second encrypted media content based on determining the third encrypted key matches the second encrypted key.

16. The method of claim 15, further comprising:
obtaining, from an encrypted content device, the first encrypted media content; and
obtaining, from a key device, the first encrypted key; and
where sending the first message including the first encrypted media content with the first encrypted key comprises:
sending, to the media client, the first encrypted media content, obtained from the encrypted content device, with the first encrypted key, obtained from the key device.

17. The method of claim 16, further comprising:
obtaining, from an unencrypted content device, the unencrypted media content; and
obtaining, from the key device, the second encrypted key; and
where sending the unencrypted media content with the second encrypted key comprises:
sending, to the media client, the unencrypted media content with the second encrypted key, obtained from the key device.

18. The method of claim 15, further comprising:
identifying, from the request, a user of the media client; and
identifying, from configuration information, a property associated with the user of the media client; and where determining the unencrypted media content to be sent to the media client comprises:
    determining the unencrypted media content based on the property associated with the user of the media client.

19. The method of claim 18, where the property associated with the user includes demographic information that is used to determine information within the unencrypted media content, and
    where the method further comprises:
       generating a playlist.

20. The method of claim 15, further comprising:
    identifying the unencrypted media content from a list of unencrypted media content.

* * * * *